(12) United States Patent
Hymel et al.

(10) Patent No.: US 9,374,670 B2
(45) Date of Patent: Jun. 21, 2016

(54) SYSTEM AND METHOD FOR DETERMINING A LOCATION-BASED PREFERRED MEDIA FILE

(75) Inventors: James Allen Hymel, Kitchener (CA); Jean Philippe Bouchard, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 81 days.

(21) Appl. No.: 12/860,007

(22) Filed: Aug. 20, 2010

(65) Prior Publication Data
US 2012/0046050 A1    Feb. 23, 2012

(51) Int. Cl.
*H04W 4/02*    (2009.01)

(52) U.S. Cl.
CPC ..................... *H04W 4/028* (2013.01)

(58) Field of Classification Search
USPC ....................... 455/456.1–457, 566
See application file for complete search history.

(56) References Cited

U.S. PATENT DOCUMENTS

| | | | |
|---|---|---|---|
| 7,227,071 B2 | 6/2007 | Tagawa et al. | |
| 7,542,816 B2 | 6/2009 | Rosenberg | |
| 7,796,190 B2* | 9/2010 | Basso et al. | 348/445 |
| 8,010,279 B2* | 8/2011 | Kobuya et al. | 701/438 |
| 8,131,676 B2* | 3/2012 | Pettit et al. | 707/625 |
| 8,751,611 B2* | 6/2014 | Nathan | G11B 19/025 345/173 |
| 2006/0123014 A1 | 6/2006 | Ng | |
| 2007/0061245 A1 | 3/2007 | Ramer et al. | |
| 2007/0142090 A1* | 6/2007 | Rydenhag et al. | 455/566 |
| 2007/0214182 A1* | 9/2007 | Rosenberg | 707/104.1 |
| 2008/0019221 A1 | 1/2008 | Freihofer | |
| 2008/0051081 A1 | 2/2008 | Nelson | |
| 2008/0064351 A1* | 3/2008 | Landschaft et al. | 455/187.1 |

(Continued)

FOREIGN PATENT DOCUMENTS

| | | |
|---|---|---|
| JP | 2002245053 A | 8/2002 |
| WO | 2008030687 A2 | 3/2008 |

(Continued)

OTHER PUBLICATIONS

Mobile Music Production: http://www.readwriteweb.com/archives/iphone_app_trends_music_health_and_augmented_reali.php. Retrieved on Aug. 2, 2009.

(Continued)

*Primary Examiner* — Steven Kelley
(74) *Attorney, Agent, or Firm* — Jose Gutman; Fleit Gibbons Gutman Bongini & Bianco P.L.

(57) ABSTRACT

A system and method for determining a location-based preferred media file includes a position module and a processor communicatively coupled to the position module. The processor configured to execute instructions to determine a current position of the mobile device based at least partially on data from the position module, to request data for a preferred media file associated with the determined current position of the mobile device, and to receive data representative of the preferred media file. The preferred media file can be a video file or an audio file that is selected based upon frequency that the media file has been played within a predetermined distance from the determined current position of the mobile device. The frequency can be based upon the total number of plays of the media file, the number of unique plays of the media file, or from trend data received from an external resource.

19 Claims, 12 Drawing Sheets

(56) References Cited

U.S. PATENT DOCUMENTS

| | | | |
|---|---|---|---|
| 2008/0109404 A1 | 5/2008 | Holm | |
| 2008/0184359 A1* | 7/2008 | Khedouri et al. | 726/12 |
| 2008/0248740 A1* | 10/2008 | Lazovsky et al. | 455/3.01 |
| 2008/0248809 A1* | 10/2008 | Gower | H04W 4/02 455/456.1 |
| 2008/0254809 A1 | 10/2008 | Kraufvelin et al. | |
| 2009/0003659 A1 | 1/2009 | Forstall et al. | |
| 2009/0249222 A1* | 10/2009 | Schmidt et al. | 715/751 |
| 2009/0325602 A1* | 12/2009 | Higgins | H04W 4/02 455/456.2 |
| 2010/0042932 A1* | 2/2010 | Lehtiniemi et al. | 715/747 |
| 2010/0087209 A1* | 4/2010 | Holm et al. | 455/457 |
| 2010/0138742 A1 | 6/2010 | Holm et al. | |
| 2013/0288715 A1* | 10/2013 | Shieh | H04W 4/043 455/456.3 |
| 2013/0331087 A1* | 12/2013 | Shoemaker | H04L 67/125 455/420 |
| 2014/0092730 A1* | 4/2014 | Yang | H04W 28/0226 370/229 |
| 2014/0162695 A1* | 6/2014 | Jeon | H04W 4/023 455/456.3 |
| 2015/0105096 A1* | 4/2015 | Chowdhury | H04W 64/00 455/456.1 |

FOREIGN PATENT DOCUMENTS

| | | | |
|---|---|---|---|
| WO | 2009101629 A2 | 8/2009 | |
| WO | 2009108703 A1 | 9/2009 | |
| WO | 2011100307 A1 | 8/2011 | |

OTHER PUBLICATIONS

Nicole Martinelli-iPhone Augmented Reality App Helps You Find Car, Monuments, Friends—Retrieved from http://www.cultofmac.com/iphone-augmented-reality-app-helps-you-findcar-monuments-friends/21019. Retrieved Nov. 11, 2009.

Hunter Research Technology—http://hunter.pairsite.com/theodolite/- Retrieved on Jan. 9, 2012.

Mobile phones that track your buddies—http://news.cnet.com/Mobile-phones-that-track-your-buddies/2100-1039_3-6135209.html. Retrieved Nov. 14, 2006.

Whrll—Location-based Services and Social Networking Sites—A match made in Heaven?—http://www.currentanalysis.com/h/2008/LBS-SocialNetworking.asp Retrieved Jul. 15, 2008.

Extended Search Report dated Apr. 21, 2011. In corresponding application No. 10173607.2.

Nygaard- Jensen, Tore: "Sharing Music and Contextual Information in Mobile Social Networks", Kgs. Lyngby, Denmark, Technical University of Denmark (DTU), 2010, Series: IMM-M.Sc.-2010-23, May 31, 2010., XP002620032, Retrieved from the Internet: URL:http://forskingsbasen.deff.dk/View.external?recordId=dtu260332—retrieved from the Internet: Feb. 2, 2011—Document consists of pp. FP, i, iii, v, viii, 1-129, section 5.7, section 5.10 p. 18-p. 20.

Espinoza, Fredrik et al. GeoNotes: Social and Navigational Aspects of Location-Based Information Systems, UBICOMP 2001. UBIQITOUS Computing, vol. 2201, 2001, pp. 2-17, XP002609531, DOI: 10.1007/3-540-45427-6_2. abstract. p. 6, line 27—p. 6, line 30 page.

TuneWiki—http://www.tunewiki.com/ pp. 1-5. Retrieved Jan. 12, 2012.

International Search Report and Written Opinion of the International Searching Authority mailed Oct. 18, 2011. In corresponding application No. PCT/CA2011/050512.

Notification of transmittal of International Preliminary Report on Patentability mailed Jan. 3, 2013, in corresponding PCT patent application No. PCT/CA2011/050512.

Examination Report mailed Sep. 11, 2012, in corresponding European patent application No. 10173607.2.

Office Action mailed Sep. 30, 2014; in Canadian patent application No. 2,806,485.

European Summons to Attend Oral Proceedings Pursuant to Rule 115(1) EPC dated Jul. 10, 2015, received for European Application No. 10173607.2.

Canadian Office Action dated Jul. 17, 2015, received for Canadian Application No. 2,806,485.

\* cited by examiner

SYSTEM AND METHOD FOR DETERMINING A LOCATION-BASED PREFERRED MEDIA FILE

FIELD

This disclosure, in a broad sense, is directed toward a system and method for determining a preferred media file. More specifically, this disclosure relates to determining a preferred media file that is based on the location of a mobile device.

BACKGROUND

With the advent of more robust electronic systems, advancements of mobile devices are becoming more prevalent. Mobile devices can provide a variety of functions including, for example, telephonic, audio/video, and gaming functions. Mobile devices can include mobile stations such as cellular telephones, smart telephones, portable gaming systems, portable audio and video players, electronic writing or typing tablets, handheld messaging devices, personal digital assistants, and handheld computers.

Mobile devices allow users to have an integrated device which can perform a variety of different tasks. For example, a mobile device can be enabled for each of or some of the following functions: voice transmission (cell phones), text transmission (pagers and PDAs), sending and receiving data for viewing of Internet websites, multi-media messages, videography and photography. Additionally, mobile devices can include one or more applications such as a map application which presents and retrieve directions to locations relative to the mobile device, or media applications which enable playback of a media file. When enabled for media playback, the user can listen to music, watch videos, watch animation, and the like.

BRIEF DESCRIPTION OF THE DRAWINGS

Implementations of the present application will now be described, by way of example only, with reference to the attached figures, wherein.

DETAILED DESCRIPTION

Figure 1:
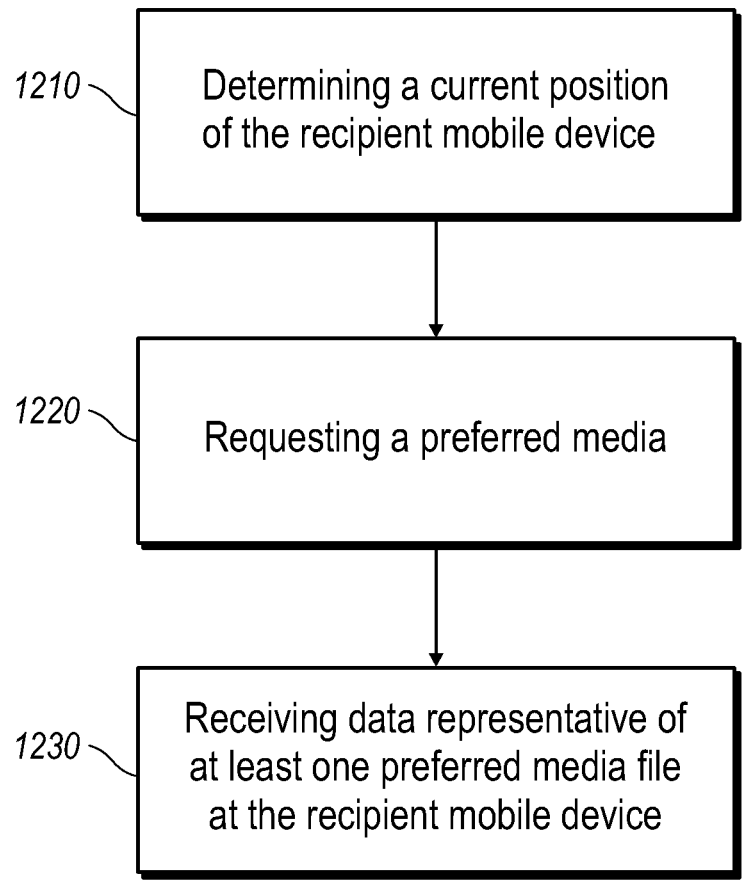
FIG. 1 is a flow diagram representing the method of determining a location-based media file.

As will be appreciated for simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The word "coupled" is defined as connected, whether directly or indirectly through intervening components, and is not necessarily limited to physical connections. The term "communicatively coupled" is defined as connected whether directly or indirectly though intervening components, is not necessarily limited to a physical connection, and allows for the transfer of data. The term "mobile device" is defined as any electronic device that is capable of at least accepting information entries from a user and includes the device's own power source. A "wireless communication" means communication that occurs without wires using electromagnetic radiation. The term "highlight" refers to altering the appearance of a graphical item displayed on the display screen to indicate that the graphical item has been selected for execution. For example, highlighting can include changing the color of the graphical item, changing the font or appearance of the graphical item, applying a background color to the graphical item, superimposing a block of semi-transparent color over the graphical item, placing a border around the graphical item, enlarging the graphical item as compared to other graphical items proximate to the highlighted graphical item, or other similar and known methods of highlighting graphical items or text items display on a display screen. The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies. The term "media" is defined as visual, audio, or combined visual and audio data which can be outputted by a mobile device. Additionally, "media" refers to transitory or non-transitory media. Non-transitory media includes all media that is not transitory memory capable of only propagating a signal. Examples of media can include, but are not limited to, video files, audio tracks, multimedia files, music files, songs, movies, animations, graphics, MIDI files, or any other media file which can be played or outputted by a mobile device. The term "preferred media file" refers to media files that have been identified as unique. For example, the preferred media file can be, but is not limited to, a most-played song, a most-popular song, a top-rated song, a video tagged to a location, a song associated with a location, a media played by the most devices gathered in one location, or the like.

Mobile devices enabled for media playback allow the user of the mobile device to watch videos, listen to music, watch and listen to streamed media, listen to a radio station, watch movies, watch animations, play video games, or otherwise listen, view, or interact with media content. Additionally, mobile device can also be enabled to access geographical location information relating to the current location of the mobile device. The present disclosure enables a user to retrieve media files related to a geographical location relative to the current location of the mobile device. The media files can be preferred media files. The preferred media files allow a user to determine the popularity of the mobile device's current location or the type of entertainment associated with the mobile device's current location. In other instances the preferred media files related to a geographical location aid the user in deciding to which new location to travel or to prepare oneself for the entertainment associated with the new location to which the user will travel.

The present disclosure provides a system and method for determining a location-based preferred media file. The system and method includes a position module and a processor communicatively coupled to the position module. The processor is configured to determine a current position of a mobile device; request data for a preferred media file associated with the determined current position of the mobile device, and receive data representative of the preferred media file. The preferred media file can be selected based upon frequency that a media file has been played within a predetermined distance from the determined current position of the mobile device.

FIG. 1 is flow diagram of the method 1200 for determining a location-based preferred media file. The method 1200 for determining a location-based preferred media file associated with the location of the mobile device includes receiving a request to retrieve a preferred media file. The request can be received at a processor coupled to the mobile device. For example, when a user desires to retrieve a preferred media file associated with the current position of the user's mobile device, the user can input a request to retrieve the preferred media file on the mobile device. In at least one implementation, the user can initiate an application that is enabled on the mobile device and that is programmed to determine a preferred media file associated with the current location of the media device.

In response to the request, the current position of the mobile device is determined (block 1210). In one exemplary implementation, the current position of the mobile device can be determined based on data from a position module coupled to the mobile device. For example, the mobile device can be equipped with a global position system (GPS), and the GPS can determine the geographical coordinates of the current position of the mobile device. Alternatively, a triangularization method using cellular towers proximate the mobile device can be utilized to determine the current position of the mobile device. While a GPS or triangularization method can be implemented to determine the position of the mobile device, other methods of determining the location of a mobile device can be implemented.

With the current position determined, the device requests data for a preferred media file associated with the determined current position of the mobile device (block 1220). In at least one implementation, requesting data for a preferred media file can include searching a database using the positional data of the determined current position of the mobile device. For example, the device can request data from an external source, such as remote server having a database of media files, to retrieve data representative of at least one preferred media file associated with the positional data of the determined current position of the mobile device. Alternatively, the device can request data for a preferred media file from other external sources such as an internet site, a blog, text-based posts, trending data, an internet-search engine, a server of a cellular service provider, or any other source of location-based media files. In other implementations, the request for data for a preferred media file can be sent to a plurality of other devices located proximate to the current position of the mobile device to retrieve media files associated with the current position of the mobile device, and the processor on the mobile device can determine which media file is a preferred media file. While external resources can provide data for a preferred media file, local resources can also be utilized. For example, the mobile device can request data from a local database of media files, and the processor of the mobile device can determine which of the local media files is a preferred media file associated with the current position of the mobile device.

The mobile device receives data representative of the preferred media file (block 1230). In at least one implementation, the received data can be a video file, an audio track, a list of media files, or any other data representative of a preferred media file. The data representative of the preferred media file can include links to the media file, a file directory location of where the preferred media files can be retrieved, an indication of whether the file is currently on the mobile device, and possible ways of obtaining the file, including downloading, purchasing as part of another product, or any other avenue for obtaining the preferred media file. Upon receipt of the data representative of the preferred media file, a request can be made to play the preferred media file on the mobile device.

Figure 2:
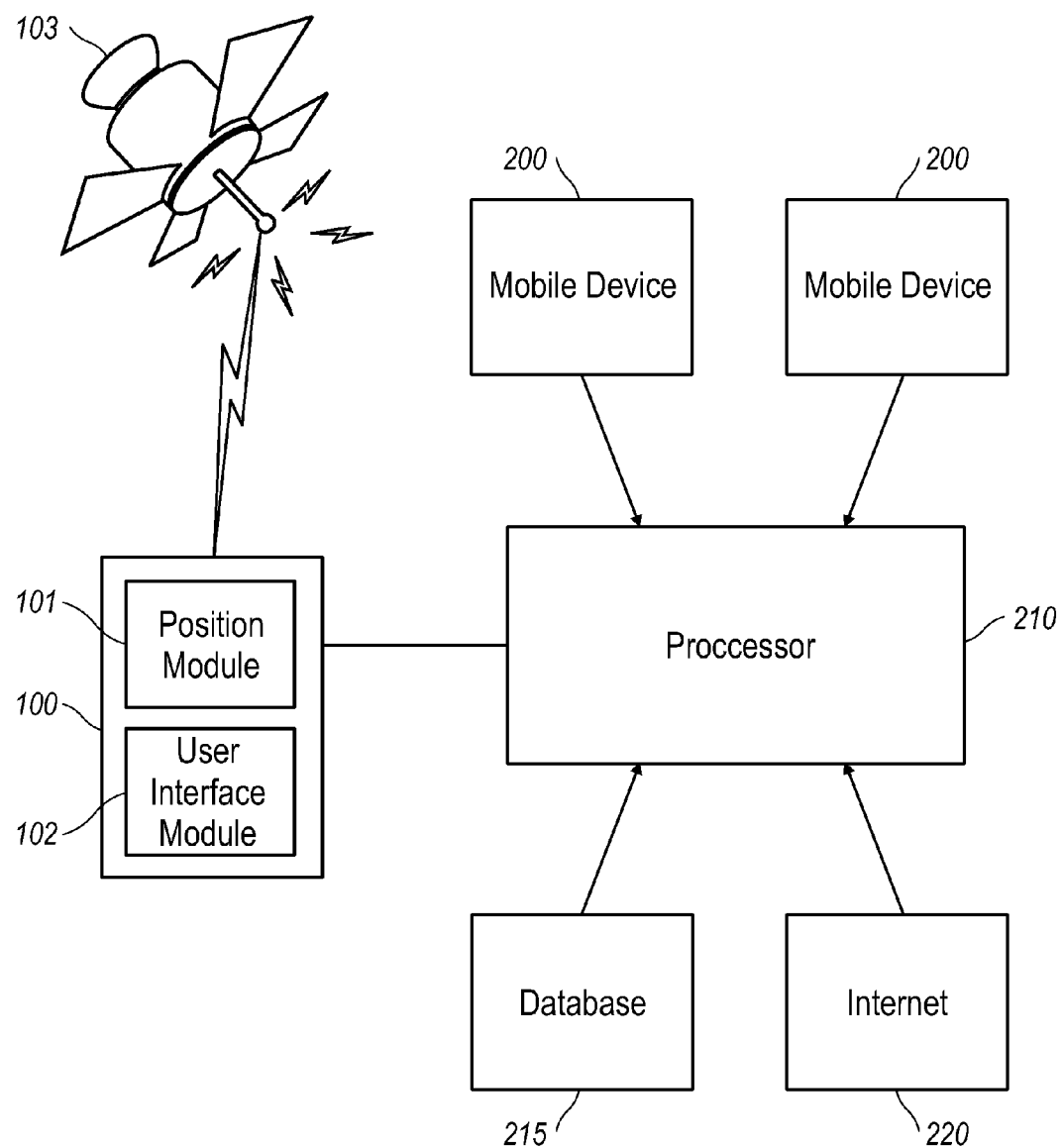
FIG. 2 is a block diagram representing a mobile device interacting with a processor and external resources to determine a preferred media file based on location.

FIG. 2 is a block diagram representing a mobile device interacting with a processor to determine a preferred media file based on location. FIG. 2 illustrates a mobile device 100 that is enabled to communicate with a satellite 103 and that is coupled to a processor 201. The processor 201 can communicate with a plurality of external resources (for example mobile devices 200, database 215, and internet 220). In the exemplary implementation illustrated in FIG. 1, the mobile device 100 includes a user interface module 102 from which a user of the mobile device 100 can request to retrieve a preferred media file associated with the current position of the mobile device 100. The mobile device also includes a position module 101 configured to sense the geographical position of the mobile device 100. In the illustrated implementation, the position module 101 communicates with a satellite 103 to gather positional data of the mobile device 100. For example, position module 101 can determine the longitudinal and latitudinal coordinates of position of the mobile device 100, or any other positional data that is indicative of the current location of the mobile device 100.

In FIG. 2, the mobile device 100 is also communicatively coupled to a processor 210. The mobile device 100 can be directly or indirectly communicatively coupled to the processor 210. The processor 210 can be configured to execute instructions to determine the current position of the mobile device based at least partially on data from the position module 101. In at least one implementation, the processor 210 can determine a specific location associated with the positional data sensed by the position module 101, based on the positional data (for example, geographic coordinates). For example, the processor 210 can determine the particular venue, physical address, a landmark scenic location, district, neighborhood, street, building, city, or any other location associated with the mobile device's current position.

The processor 210 can also execute instructions to retrieve data representative of a preferred media file associated with the positional data of the mobile device's 100 current position from at least one of an external resource and a local resource. In the implementation illustrated in FIG. 2, the processor 210 is configured to communicate with a plurality of resources: other mobile devices 200 having the positional data within a predetermined distance from the positional data of the user's mobile device 100, the internet site 220, and a database 215. In the exemplary implementation illustrated in FIG. 2, the processor 210 sends a request to one of the external resources 200, 215, 220 to retrieve the data representative of the preferred media file associated with the current position of the mobile device 100. For example, the processor 210 can send a request to other mobile devices 200 located within a predetermined distance from the current position of the mobile device 100 to retrieve data representative of media that the other mobile devices 200 are currently playing or have played while located within a predetermined distance from the current position of the mobile device 100. The processor 210 can execute instructions or an algorithm to determine which media file played on the other mobile device 200 in the vicinity of the mobile device 100 is the preferred media file. For example, the preferred media file can be the media file that is being played on the most number of mobile devices 200 within the vicinity of the mobile device 100, the media file that has been repeatedly played by the mobile devices 200 within the vicinity of the mobile device 100, or any other similar preferred media file.

In another implementation, the processor 210 can communication with the database 215 illustrated in FIG. 2 to retrieve data representative of preferred media files associated with the current position of the mobile device 100. The database 215 can be an external database located on a third-party's server (not shown), such as the server of a cellular network provider, an internet service provider, or any other similar electronic storage of media files. The database 215 can include a collection of preferred media files associated with a plurality of positional or geographical locations. The server associated with the database 215 can be configured to collect, track, and update the positional and geographical locations of mobile device that access the database 215, as well as the media files played at the positional and geographical locations. The server can also execute instructions or algorithms to sort, organize, and rank the media files based on the positional geographical locations. The processor 210 can then send a request to the server to retrieve or search the database 215 for data representative of the preferred media file(s) associated with the current position of the mobile device 100. Alternatively, the database 215 can be locally stored on the mobile device 100, and the processor 210 can transmit a request to a service provider to update the database 215 with preferred media files associated with locational and geographical position thereby providing the mobile device 100 with the most recent preferred media file(s) associated with the current position of the mobile device 100.

In another exemplary implementation, the processor 210 can be configured to search one or more of the external resources for the preferred media file associated with the mobile device's 100 current position and data relating to the preferred media file. For example, the processor 210 can search third party databases 215, as previously described or can search the internet, as illustrated in FIG. 2. In FIG. 2, the processor 210 can communicate with the internet 220 to retrieve data representative of the preferred media file(s) associated with the current position of the mobile device 100. The processor 210 can execute instructions to access and search the internet for internet sites, blogs, web-based message boards, internet search engines, or any other internet-based resource having data representative of location-based media files to retrieve data representative of the preferred media files associated with the mobile device's current position. In another implementation, the processor 210 can retrieve data representative of preferred media files associated with the current position of the mobile device 100 from more than one resource, thereby ensuring the preferred media file or files is selected from a comprehensive and widespread collection of resources.

When the processor 210 receives the data relating to the preferred media file, the processor 210 can execute instructions to the user interface module 102 of the mobile device 100 to display the data relating to the preferred media file or play the preferred media file. For example, the processor 210 can send instructions to the user interface module 102 to display on the display screen of the mobile device 100 a list of a plurality of preferred media files associated with the current position of the mobile device 100.

In another implementation, the processor 210 can automatically play a single preferred media file on the mobile device 100 indicative of the most popular media file associated with current position of the mobile device 100. In another implementation, the processor 210 can also automatically play a single preferred media file indicative of: the media file most requested at the mobile device's current position, the media filed played on the most number of devices that have also been located at the mobile device's current position the media file most frequently played at the mobile device's current position, or the like. Although the present disclosure describes utilizing one processor to determine the current location of the mobile device and the location-based preferred media file, one of ordinary skill will appreciate that a plurality of processors can be utilized to make the determinations. Additionally, one of ordinary skill in the art will also appreciate that the method disclosed herein can be performed by devices other than a processor, such as a hardware component, a hardware driver, an API, or other similar devices and components that can either be local to the mobile device 100 or remote from the mobile device 100.

Figure 3:
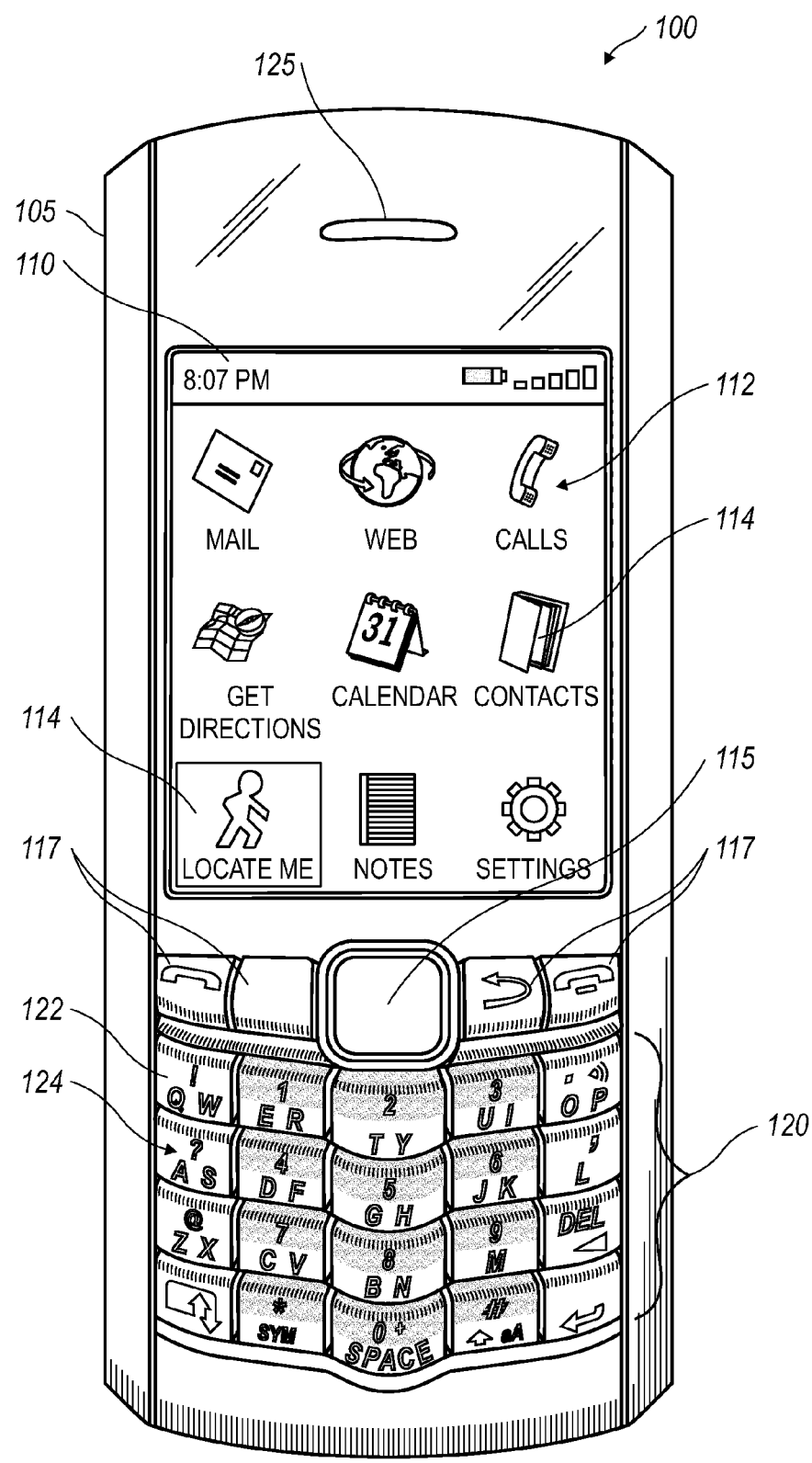
FIG. 3 is an exemplary mobile device displaying a list of user-selectable options with one of the user-selectable options identified for selection.

FIG. 3 illustrates an exemplary implementation of a mobile device 100 configured to implement the system and method of determining a location-based preferred media file. The mobile device 100 includes a display screen 110 for displaying graphical user-interfaces associated with applications programmed on the mobile device 100. The display screen 110 can be a liquid crystal display (LCD) screen, a light emitting diode (LED) screen, on organic light emitting diode (OLED) screen, a touch-sensitive display screen, or the any display screen on which graphical or visual elements can be displayed. Above the display screen 110 is a speaker 125 for emitting sound from the mobile device 100. Below the display screen 110 is a row of function buttons 117 and a navigation tool 115. The function buttons 117 can include a dial call button, a return key, a menu button, an end call button, or any other function button. The navigation tool 115 can be an omnidirectional pad, a jogball, a trackball, an omnidirectional joystick, a scroll wheel, and optical navigation tool, and optical trackball, or any other navigation tool. Below the row of function buttons 117 and navigation tool 115 is a keyboard 124 having a plurality of keys 122. The keyboard 124 can be a full keyboard, a reduced keyboard, or a numerical keypad. In the illustrated implementation, each key 122 of the keyboard 124 bears at least one of an alphabetic, numeric, symbolic, or functional indicia. The indicia signify the data input to be input upon actuation of the key 124 bearing the indicia. In FIG. 3, the keyboard 124 is a reduced keyboard 124, where at least one key 122 is associated with more than one alphabetic indicia. The indicia on the keys 122 of the keyboard 124 are arranged in a QWERTY keyboard layout 120; however, one of ordinary skill in the art will appreciate that the keyboard layout 120 can be an AZERTY layout, a QWERTZ layout, a DVORAK layout, a pinyin Chinese keyboard layout, or any other keyboard layout that allows a user to input alphabetic, numeric, symbolic, and functional indicia.

In the particular implementation illustrated in FIG. 3, the display screen 110 displays a plurality of user-selectable options 114 arranged in an array 112, such as a menu. Each user-selectable option 114 may be highlighted and selected for execution by the processor 210 (not shown) of the mobile device 100. In particular, the illustrated menu includes a user-selectable option for launching an email or text message application (e.g. "Mail"), an internet application (e.g. "Web"), a voice call application (e.g. "Calls"), a map application (e.g., "Get Directions"), an organizer application (e.g., "Calendar"), an address book application (e.g., "Contacts"), an application for determining a location-based preferred media (e.g., "Locate Me"), a word processor application (e.g., "Notes"), and a settings application (e.g., "Settings"). However, one of ordinary skill in the art will appreciate that the displayed list of user-selectable options 114 can have fewer or more applications than those applications illustrated in FIG. 3.

In the particular implementation illustrated in FIG. 3, the Locate Me user-selectable option 114 is highlighted. By highlighting the user-selectable option 114, user-selectable option 114 can be selected for execution by the processor 210 (not shown) of the mobile device 100. When the "Locate Me" user-selectable option is selected, the processor 210 of the mobile device 100 may execute or launch associated with the "Locate Me" user-selectable option 114. In the illustrated implementation, selection of the "Locate Me" user-selectable option 114 launches an application for determining a location-based preferred media file, as will be described in the following paragraphs. While the illustrated implementation illustrates the a highlighted user-selectable option 114 with a square border, one of ordinary skill in the art will appreciate that highlighting user-selectable options 114 can include changing the user-selectable option 114 to a different color, enlarging the user-selectable option to a size larger than non-highlighted user-selectable options, or any other known method of highlighting user-selectable options.

Exemplary implementations of determining a location-based preferred media file will be discussed with respect to FIGS. 4-10.

Figure 4:
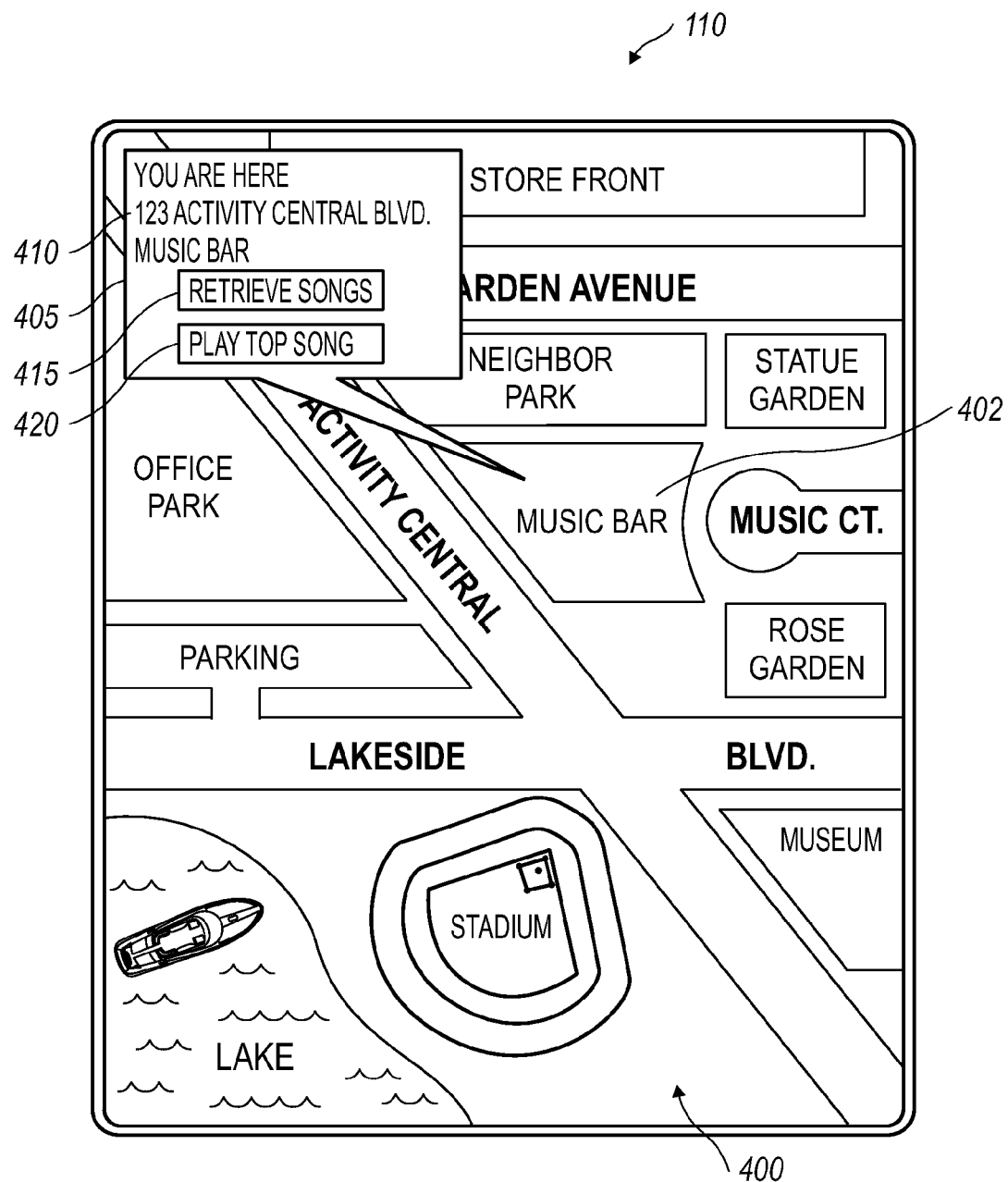
FIG. 4 is an exemplary screenshot that is displayed on the display screen of a mobile device when the user-selectable option identified for selection in FIG. 2 is executed.

FIG. 4 illustrates an exemplary screenshot of the display screen 110 of a mobile device 100 when the user-selectable option Locate Me 114 (shown in FIG. 3) has been selected. When the "Locate Me" application is launched, the processor 210 (not shown) of the mobile device 100 has determined the current position 402 of the mobile device 100 and a map 400 corresponding to the current position 402 of the mobile device 100 is displayed on the display screen 110. The map 400 can show the specific location of the mobile device's current position 402, the surrounding vicinity of the mobile device's current position 402, the neighborhood associated with the mobile device's current position 402, the city associated with the mobile device's current position 402, or any other geographical illustration of the mobile device's current location 402. A dialog box 405 is displayed proximate the mobile device's current position 402. The dialog box 405 can include the address 410 associated with the mobile device's 100 current position 402, a Retrieve button 415, and a Play button 420. However, one of ordinary skill in the art will appreciate that more or less information and fewer or more option buttons can be included in the dialog box 405 than are shown in FIG. 4.

In FIG. 4, the mobile device's current position 402 is the Music Bar having the address "123 Activity Central Boulevard." The map 400 displayed on the display screen 110 of the mobile device 100 includes the surrounding neighborhood of the mobile device's current position 402. A dialog box 405 is overlaid on the map 400 proximate the mobile device's current position 402. The dialog box 405 identifies the address 410 of the mobile device's current position 402, a Retrieve Songs button 415, and a Play Top Song button 420. The Retrieve Songs button 415 allows the user of the mobile device 100 to send a request to retrieve preferred media files (e.g., songs) associated with mobile device's current position 402, the Music Bar. The Play Top Song button 420 allows the user to send a request to play the top song associated with the mobile device's current position 402, the Music Bar, on the mobile device 100. For example, in FIG. 4 if the user selects the Retrieve Songs button 415, the processor of the mobile device can display another dialog box on the map 400 having a list of preferred media files associated with the Music Bar. Alternatively, if the user selects the Retrieve Songs button 415, a new window can be displayed on the display screen 110 having a list of preferred media files associated with the Music Bar or other data representative of preferred media files associated with the Music Bar.

Figure 5:
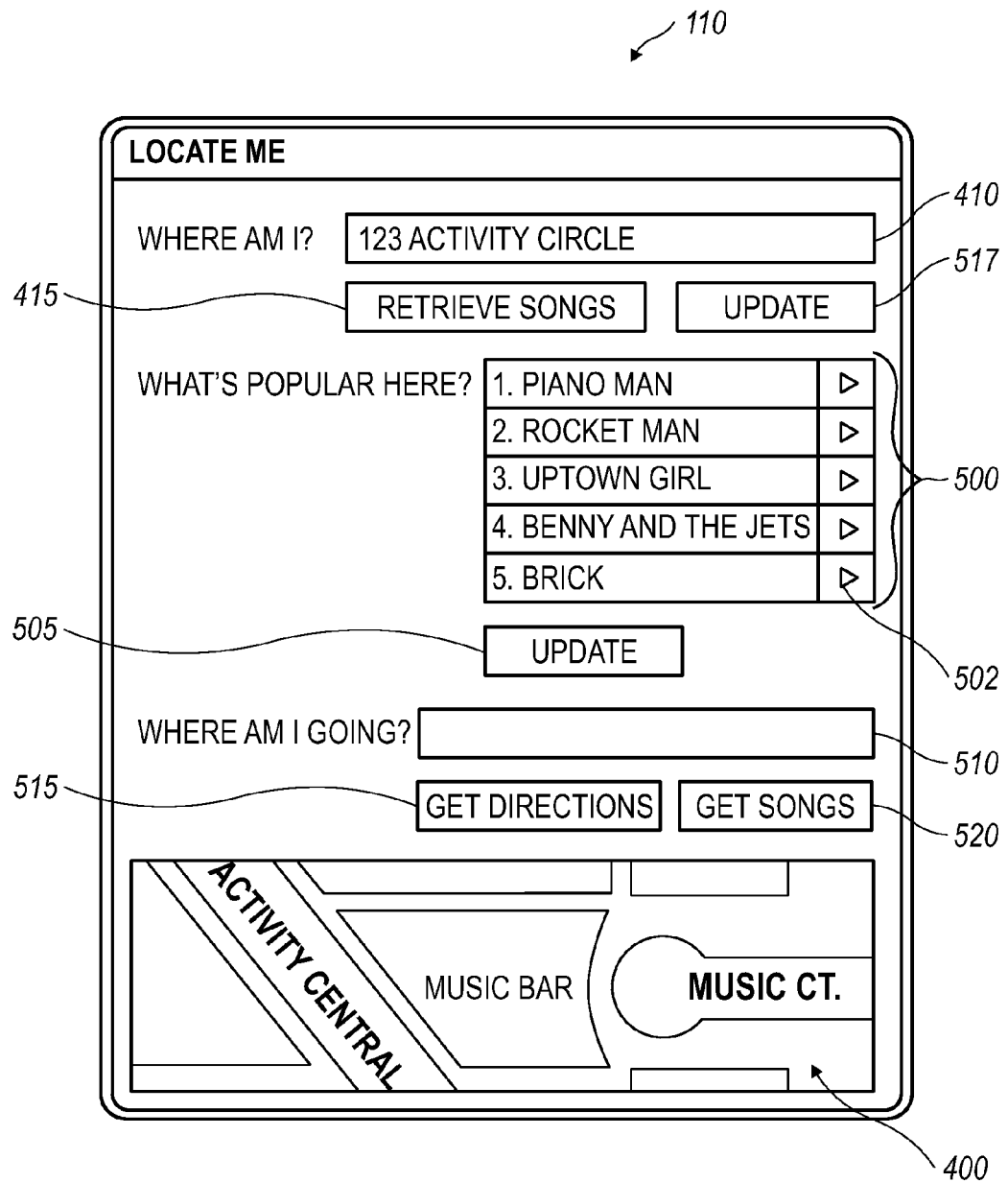
FIG. 5 is an exemplary screenshot that is displayed on the display screen of a mobile device when the user-selectable option identified for selection in FIG. 2 is executed, in accordance with an alternative implementation, illustrating a displayable list of preferred media files.

FIG. 5 is an alternative implementation of the system and method for determining a location-based preferred media file. When an application for determining a location-based preferred media file (such as the Locate Me application) is launched or executed, the processor 210 (not shown) of the mobile device 100 determines the current position of the mobile device 100 and displays a request dialog box on the display screen 110 of the mobile device 100. The request dialog box illustrated in FIG. 5 includes the address 410 associated with the current position of the mobile device 100, a list 500 of preferred media files associated with the address 410, and a map 400 showing the current position of the mobile device 100. The address 410 is displayed next to the "Where Am I?" field. Below the address 410 are a Retrieve Songs button 415 and an Update location button 517. When the Retrieve Songs button 415 is selected, a request can be sent to the processor 210 to retrieve preferred media files, such as songs, associated with the address 410 displayed in the "Where Am I?" field. When the Update location button 517 is selected, a request can be sent to the processor 210 to update the current position of the mobile device 100. For example, if the mobile device 100 has moved since the last instance when the Locate Me application was executed, the Update location button 517 can be selected to ensure that the current position of the mobile device 100 is accurate.

Below the "Where Am I?" field is a "What's Popular Here?" field. The "What's Popular Here?" field includes a list 500 of the preferred media files associated with the current position of the mobile device 100 identified in the address field 410. The list 500 of preferred media files can be a list of the top songs, top videos, top artists, or other data representative of the preferred media file associated with the current position 410. The preferred media files can also include the songs, videos, genres, or artists that are most frequently played at the current position 410, the songs, videos, artists, or genres, that are most requested at the current position 410, the songs, videos, artists, or genres that are played on the most number of other mobile devices that have been positioned at the current position 410 of the user's mobile device 100. In other implementations, the list 500 can display the top five preferred media files, the top three media files, the top ten media files, the top media file, or any number of top media files associated with the current position of the mobile device 100. For example, in one implementation, the mobile device 100 can send a request to the processor 210 to retrieve the list 500 of preferred media files from an external resource that records and groups the preferred media files based on the total number of times a preferred media files has been played at the mobile device's current position 410. In at least another implementation, the external resource can track the number of times every preferred media file has been played at the mobile device's current position 410, and then rank the preferred media file based on the number of times that particular preferred media file has been played as compared to other media files played at the mobile device's current position 410. In yet another implementation, the external resource can track the number of unique plays a preferred media file has been played at the mobile device's current position 410. A unique play can be the number of times any media-playing device has played the preferred media file at the user's mobile device's current position 410. Thus, with unique plays, the external resource tracks how many devices have played a preferred media at the mobile device's current position 410, and ranks the preferred media in ascending order based on the number of media-playing devices that have played the preferred media file. However, as previously discussed, any other method of determining the preferred media file(s) associated with the current position 410 can be implemented to determine the list 500 of preferred media files to be displayed on the display screen 110 of the mobile device 100.

Adjacent to each preferred media on the list 500 is an icon 502 indicative of a play option. Selection of the icon 502 allows the user to play the preferred media file or song associated with the icon 502. An Update list button 505 is provided below the list 500. Selection of the Update list button 505 allows the user to retrieve and display the most current list of preferred media files associated with the current position of the mobile device 100.

In the particular implementation illustrated in FIG. 5, the mobile device's current position is the Music Bar having the address "123 Activity Central." A map 400 is displayed at the bottom of the request dialog box showing the mobile device's current position. The list 500 of preferred media files associated with the mobile device's current position, the Music Bar, is displayed below the "Where Am I?" field. In FIG. 5, the list 500 of preferred media files, lists the songs most played at the Music Bar. The preferred media files are identified by the title of the song, and a play icon 502 is presented adjacent to the title for selection by the user to play the song associated with the play icon 502. An Update list button 505 is provided for selection to update the list 500 of preferred media files. For example, if the user has remained at the current position of the mobile device 100 for a length of time, and the list 500 of preferred media files appear dated, the user can select the Update list button 505 to ensure that the most current list 500 of preferred media files is displayed.

Below the "What's Popular Here?" field is a "Where Am I Going?" field 510. The "Where Am I Going?" field 510 allows the user to enter the address, geographical coordinates, or other identifying locational data of the next destination. A Get Directions button 515 and a Get Songs button 520 are provided below the "Where Am I Going?" field. 510. The Get Directions button 515 allows the user to retrieve directions from the mobile device's 100 current position to the next destination entered in the field 510. The Get Songs button 520 allows the user to retrieve the preferred media files associated with the next destination entered in the field 510.

Figure 6:
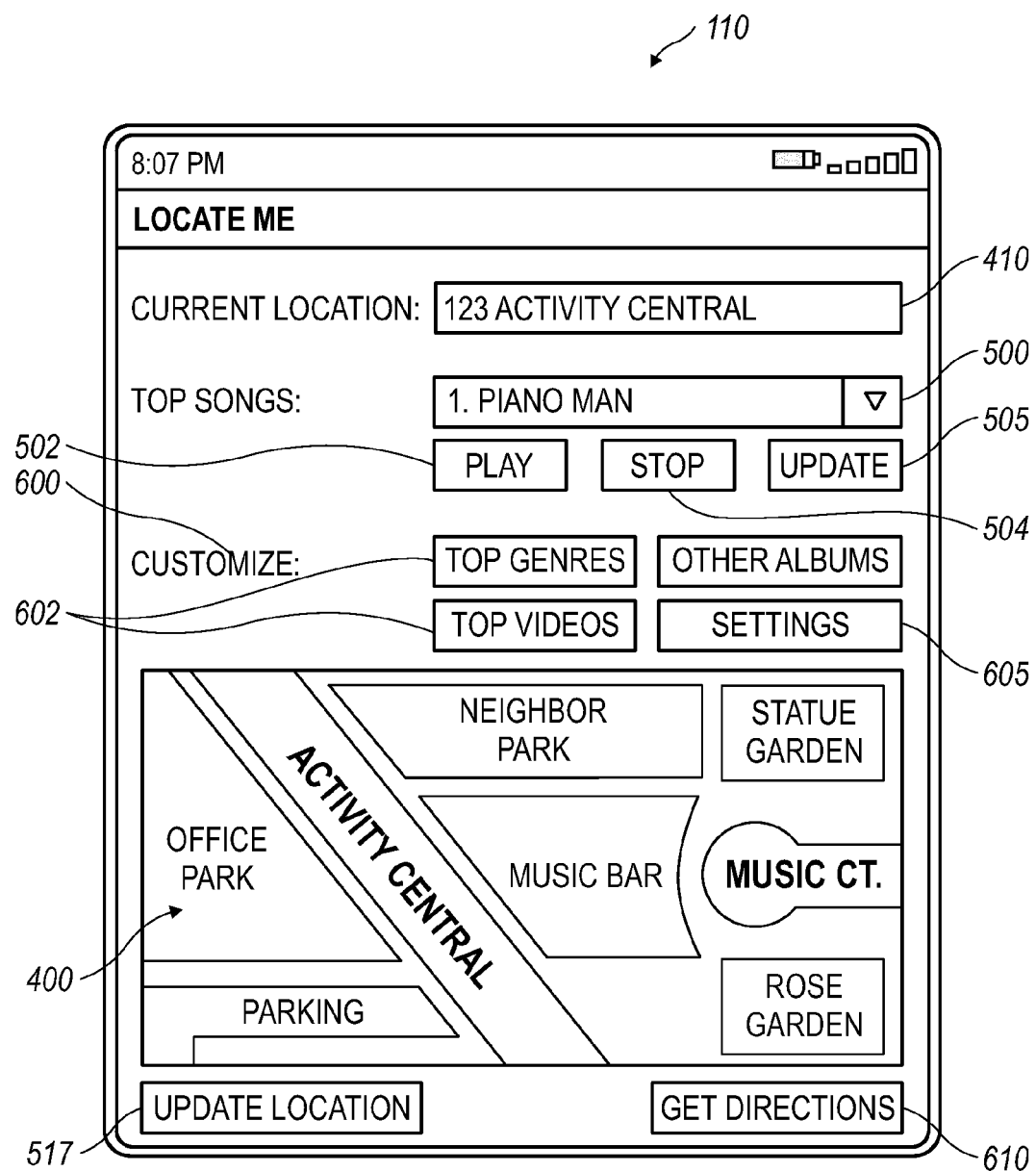
FIG. 6 is an exemplary screenshot that is displayed on the display screen of a mobile device when the user-selectable option identified for selection in FIG. 2 is executed, in accordance with an alternative implementation, illustrating a pull-down list of preferred media files.

FIG. 6 is an alternative implementation of a screenshot of the display screen 110 of the system and method for determining a location-based preferred media file. The screenshot illustrated in FIG. 6 is substantially similar to the screenshot illustrated in FIG. 5. However, FIG. 6 differs from FIG. 5 in that the list 500 of preferred media files is presented as a drop-down list or a pull-down list. FIG. 6 further includes a Play button 502 and a Stop button 504 to control the playback of the preferred media file identified in the list 500.

Additionally, FIG. 6 includes a "Customize" field 600 including a plurality of Customize buttons 602 such as a Top Genres button, a Top Videos button, an Other Albums button, and a Settings button 605. The Top Genres button allows the user to retrieve a list of preferred media files that is representative of the Top Genres of media associated with the current position identified in the "Current Location" field 410. The Top Videos button allows the user to retrieve a list of preferred media files that is representative of the Top Videos associated with the current position identified in the "Current Location" field 410. The Other Albums button allows the user to retrieve other albums of the artist associated with the displayed preferred media file in the pull-down list 500 of preferred media files. The Settings button allows the user to access other options and settings related to determining the preferred media files associated with the current position 410 of the mobile device 100. For example, the Settings button can include options for: downloading the preferred media files; purchasing the preferred media file(s); setting the number of preferred media files listed in the list 500; selecting the external or local resources from which to retrieve the list 500 of preferred media files; setting the predetermined distance from the current position 410 of the mobile device 100 from which to gather the data needed to determine the preferred media file(s) associated with the current position of the mobile device 100; as well as other options and settings relating to determining the preferred media files associated with the current position of the mobile device.

By retrieving the preferred media files associated with the current position of the mobile device 100, the user will be able to determine the media culture, the ambiance, and the mood associated with the current position 410 of the mobile 100. Additionally, the user will be able to determine what is popular in the particular venue and the surrounding vicinity associated with the current position 410 of the mobile device 100. The list 500 of location-based preferred media files provides the user with information as to the social atmosphere and culture associated with the current position of the mobile device 100.

FIG. 6 also differs from FIG. 5 in that FIG. 6 includes a Get Directions button 610. The Get Directions button 610 allows the user to enter the next destination to which the user will take his or her mobile device 100. In at least one implementation, when the Get Directions button 610 is selected, a map application can be launched from which the user can enter an address of a new destination or view a larger map from which to choose the next destination. A more detailed discussion of the system and method of determining a location-based preferred media file in regards to a future destination, such as a next destination, will be discussed with respect to FIG. 7.

Figure 7:
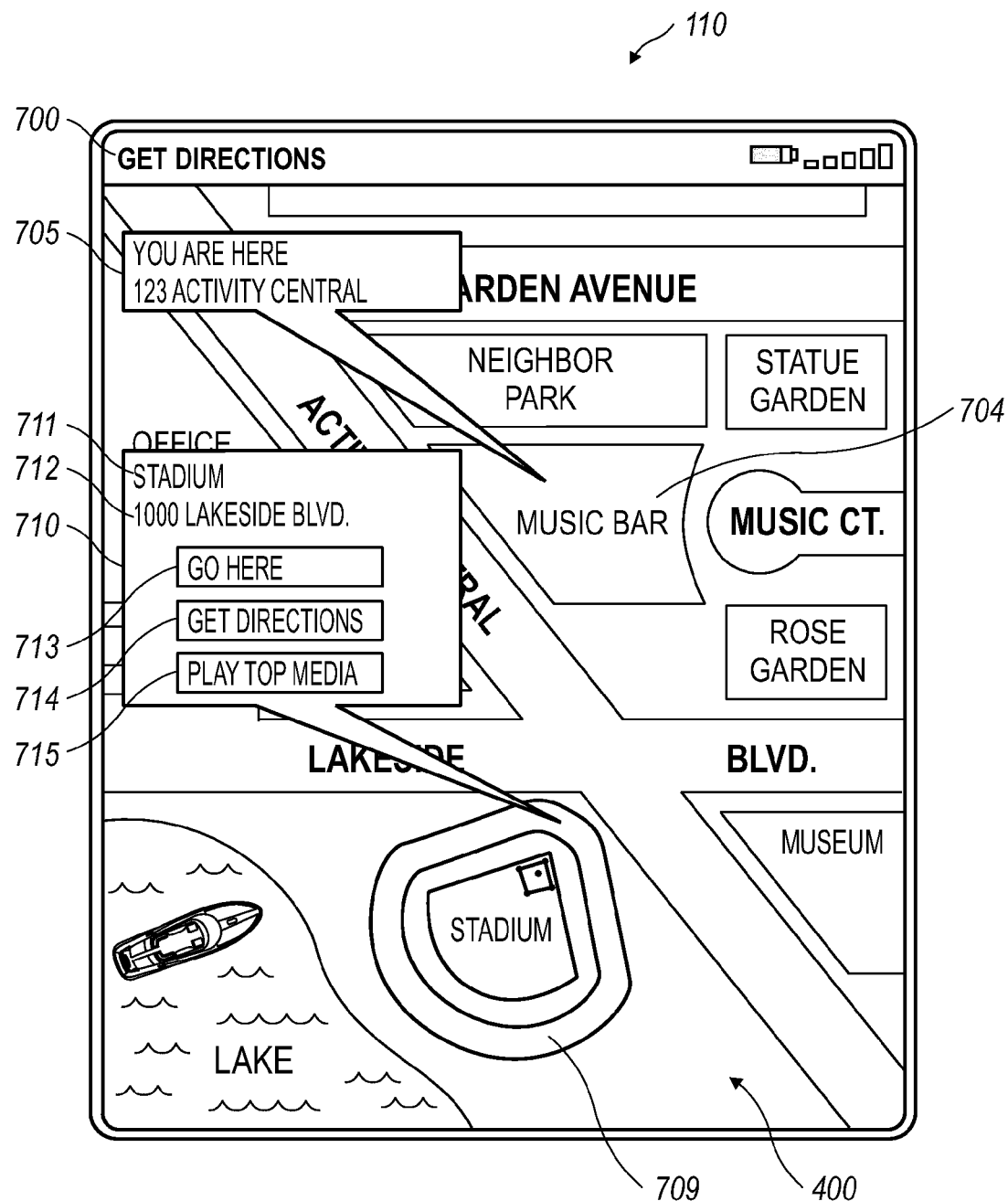
FIG. 7 is an exemplary screenshot of the system and method for determining a location-based preferred media file, in accordance with an alternative implementation, illustrating a future location.

FIG. 7 is a screenshot 700 of the display screen 110 of a mobile device 100 after an application for retrieving a map has been selected and launched, in accordance with an exemplary implementation of the system and method disclosed herein. For example, the display screen 110 illustrated can be displayed in response to launching a "Get Directions" application from the menu screen such as that illustrated in FIG. 3 or a "Locate Me" application, as illustrated in FIG. 6. In FIG. 7, the illustrated map 400 shows the current position 704 of the mobile device 100. A dialog box 705 indicating the current position 704 of the mobile device is overlaid on the map 400 proximate to the current position 704 of the mobile device 100. In the illustrated implementation, the current position 704 of the mobile device 100 is the Music Bar. The dialog box 705 can include the address, the geographical coordinates, the phone number, the name of the venue, or any other similar information associated with the current position 704 of the mobile device 100. The dialog box 705 can further include a rating indicative of the popularity of the current position 704 of the mobile device 100, a summary describing the particular venue associated with the current position 704, a list of the preferred media files associated with the current position 704, or any other information relating to the current position 704. One of ordinary skill in the art will appreciate the fewer or more buttons, options, and information can be included in the dialog box 705 than are illustrated in FIG. 7.

Additionally, in FIG. 7, the user can select another location or venue on the map 400. The other location can be a future position where the user desires to travel next. For example, in FIG. 7, the user has selected a future position 709 of the Stadium. Upon selecting the future position 709, a second dialog box 710 can be overlaid on the map 400 proximate the Stadium. The second dialog box 710 can include the name 711 and address 712 associated with the future position 709.

In FIG. 7, the dialog box 710 can include a Get Directions button 714, a Go Here button 713, and a Play Top Media button 715. The Get Directions button 714 allows the user to retrieve directions from the current position 704 of the mobile device to the future position 709 where the mobile device will travel. The Go Here button 713 can update the list of preferred media associated with the current position 704 of the mobile device to list the preferred media associated with the future position of the mobile device. The Go Here button 713 can also launch a Locate Me application as described in the preceding paragraphs to retrieve a list of the preferred media files associated with the future position 709 of the mobile device 100. The Play Top Media button 715 can be selected to play the top media file associated with the future position 709 of the mobile device 100. For example, the top media file can be the most frequently played song at the future position 709, the most requested song at the future position 709, the song played on the most number of devices that have been located at the future position 709, or the like. One of ordinary skill in the art will appreciate the fewer or more buttons, options, and information can be included in the second dialog box 710 than are illustrated in FIG. 7.

By allowing the user to play the preferred media file associated with the future position 709 of the mobile device 100, the user can prepare himself or herself for the media, entertainment, or cultural environment, atmosphere, ambiance, or mood associated with the future position 709 as he or she travels to the future position 709. In the illustrated implementation in FIG. 5, the mobile device 100 travel from the mobile device's current position 704 at the Music Bar to the future position 709 of the Stadium. The media culture and atmosphere of the Music Bar 704 and Stadium 709 are different, as the media files associated with Music Bar 704 are geared towards musical arts and the media files associated with Stadium 709 are geared towards sporting events. Therefore, by selecting the Go Here button 713 or the Play Top Media button 715 associated with the future position 709, the mobile device 100 will play media files, such as music files or video files, that are related to sporting events to get the user in the mood or atmosphere for sporting events as he or she travels to the future position 709 of the Stadium.

Figure 8:
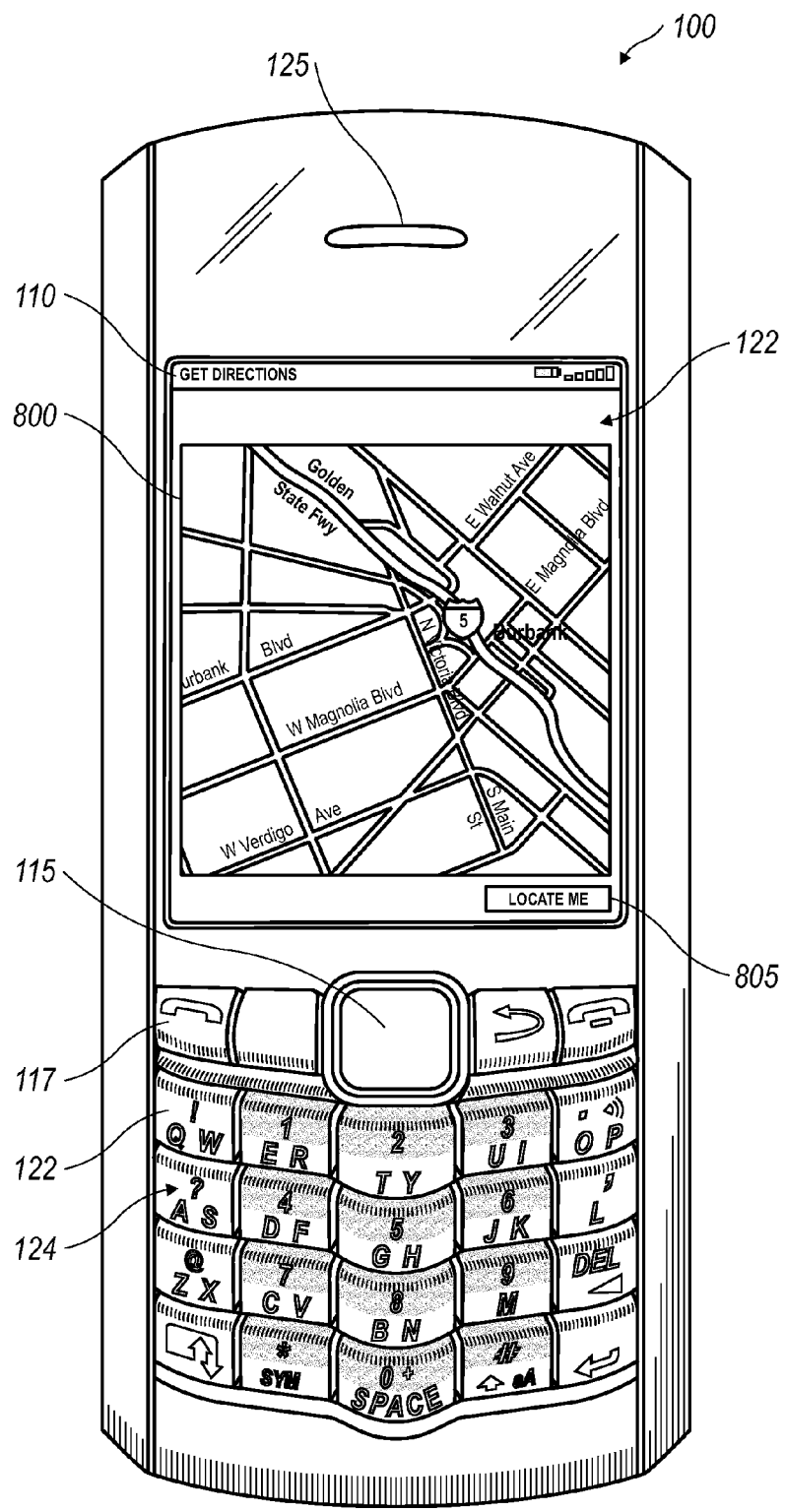
FIG. 8 is an exemplary implementation of a mobile device having a display screen displaying an exemplary screenshot of the system and method for determining a location-based preferred media file, illustrating a map that is indicative of the mobile device's vicinity.

FIG. 8 is an exemplary mobile device 100 having a display screen 110 displaying a screenshot 122 of an alternative implementation of the system and method of determining a location-based preferred media file. Specifically, FIG. 8 illustrates an implementation of the disclosed system and method where the application for retrieving a location-based preferred media file is retrieved using the same application as that for retrieving maps and directions. In FIG. 8, an application for retrieving maps and directions, such as the Get Directions application illustrated in FIG. 3, has been selected and executed. A map 800 corresponding to the current position and vicinity of the mobile device 100 is displayed upon the execution of the Get Directions application, which retrieves maps and directions to be displayed on the mobile device 100. Below the map 800 is a Locate Me button 805 which can be selected to send a request to the Get Directions application to determine the particular venue associated with the current position of the mobile device 100. Upon selecting the Locate Me button 805, a zoomed-in view of the map 800 can be displayed identifying the particular venue 900 associated with the current position of the mobile device, as shown in FIG. 9.

Figure 9:
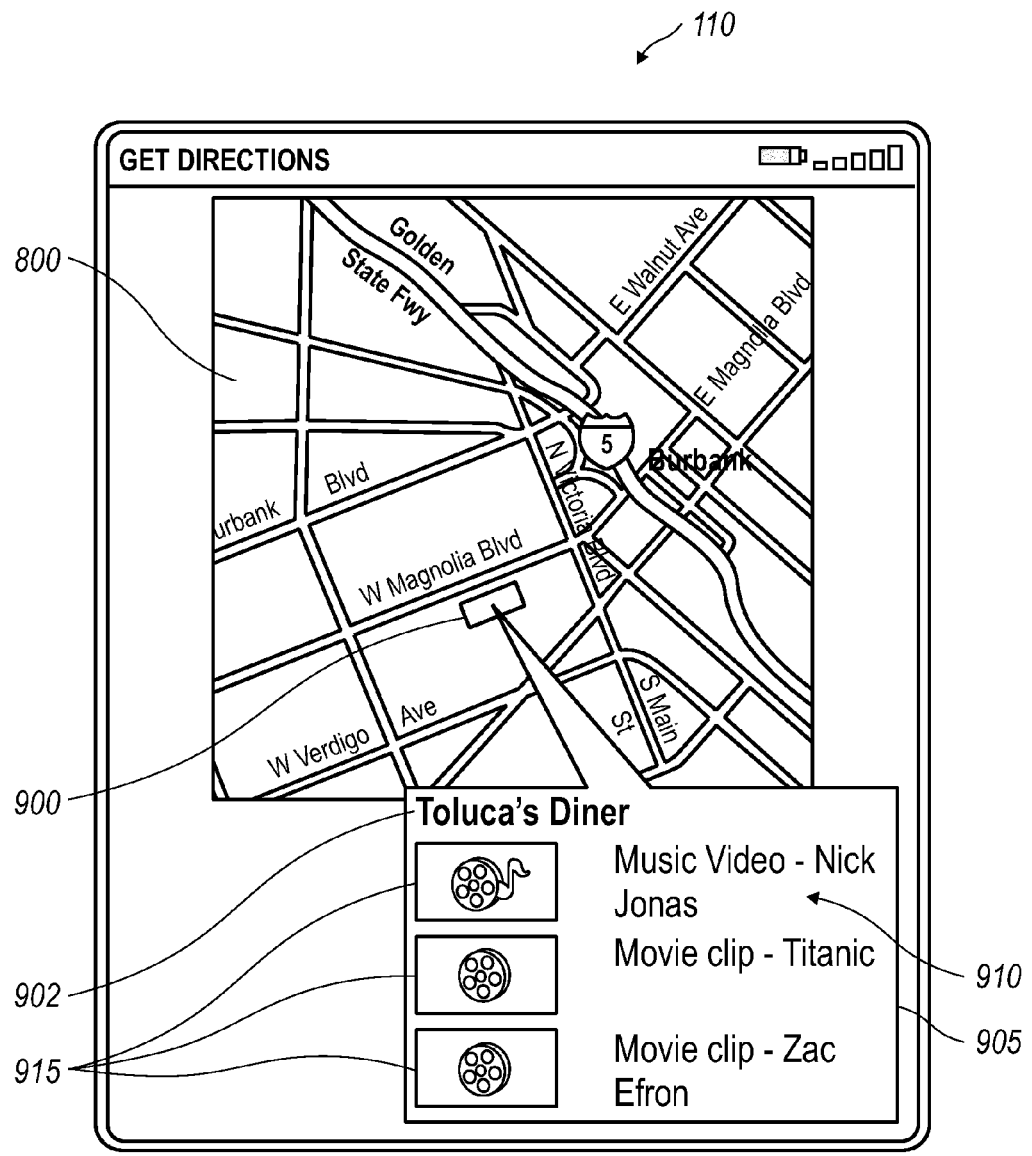
FIG. 9 is a zoomed-in view of the exemplary screenshot illustrated in FIG. 7, illustrating the mobile device's current location and a list of preferred media files based on the mobile device's current location.

In FIG. 9, the zoomed-in map 800 identifies the particular venue 900 associated with the current position of the mobile device 100 as a restaurant named Toluca's Diner. In addition to the zoomed-in map, a pop-up window 905 is overlaid on the map 800 providing information associated with the particular venue 900. While the illustrated particular venue 900 is a restaurant, the particular venue 900 can also be a bar, a club, a park, a scenic location, a monument, an attraction, a restaurant, a concert hall, a hotel, a residence, or any other similar venue associated with the current position of the mobile device 100. In the specific implementation illustrated in FIG. 9, the pop-up window 905 includes the name 902 of the venue 900 and a list 910 of preferred media files 915 associated with the particular venue 900. In FIG. 9, the list 910 of preferred media files includes a plurality of graphical items 915 representing preferred media files. The graphical items can represent audio files, video files, picture files, links to articles, or any other similar media file. Additionally, the graphical items 915 can be user-selectable to activate the associated media files represented by the graphical items. One of ordinary skill in the art will appreciate the fewer or more information and preferred media files associated with the particular venue 900 can be included in the second pop-up window 904 than are illustrated in FIG. 9.

In FIG. 9, the list of preferred media files associated with the particular venue 900 can be determined by: the frequency that a media files has been played at the particular venue 900; the frequency that a media filed has been tagged or associated with the particular venue 900 by an internet site or internet blog; the frequency that an artist associated with the media file has been identified with the particular venue 900; the most recent video clips posted by a third party, (such as an entertainment news station) has covered news stories regarding the particular venue 900; or any other method for determining the most preferred media file associated with the particular venue 900. In the implementation illustrated in FIG. 9, the list 905 of preferred media files is a list of video files of artists who most frequent the restaurant. Given a list 905 of preferred media files indicating the artists, the user can determine the social atmosphere of the particular venue associated with the current position of the mobile device 100. Additionally, the list 905 can identify the popularity of the current position of the mobile device 100. Knowing the popularity or the social atmosphere of the particular venue 900 allows the user to decide whether the venue 900 associated with the current position of the user's mobile device 100 is a desirable venue. For example, if the list 905 includes preferred media files that are dissimilar for the user's preferences and taste in media files, the user will find the particular venue 900 undesirable, and the user can travel to a new position.

Figure 10:
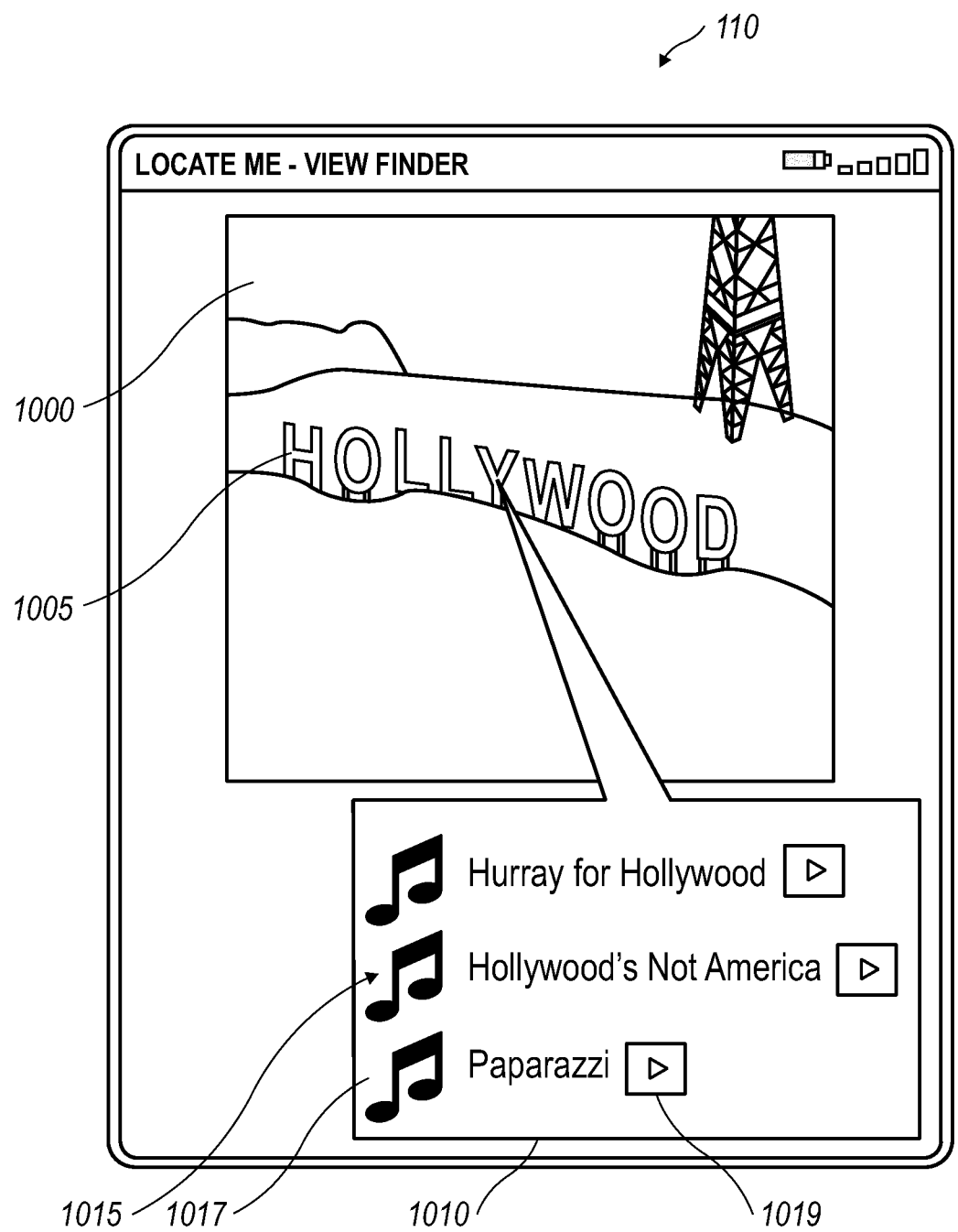
FIG. 10 is an exemplary screenshot of the system and method of determining a location-based preferred media file, in accordance with an alternative implementation that utilizes a camera viewfinder.

An alternative implementation of the system and method of determining a location-based preferred media file utilizing the camera viewfinder of a mobile device is illustrated in FIG. 10. The application configured to determine a location-based preferred media file can include an option to determine current position of the mobile device 100 using the mobile device's camera viewfinder. In such an implementation, the camera viewfinder can be focused on a particular landmark within the vicinity of the mobile device's current. For example, the landmark can include a monument, a building sign, the exterior of a building, a street sign, or any other identifying landmark associated with particular venues. The images captured by the camera viewfinder are displayed in the viewfinder window 1000 displayed the display screen 110 of the mobile device 100, allowing the user to point the camera at the landmark that will identify the current position of the mobile device 100. In FIG. 5, the camera viewfinder is positioned on the landmark 1005 of the Hollywood sign monument, indicating that the current position of the mobile device 100 is Hollywood. As the application for determining the location-based preferred media file has been executed, a pop-up window 1010 can be displayed proximate the landmark 1005 shown in the viewfinder window 1000. The pop-up window 1010 displays a list 1015 of preferred media files 1017 associated with the landmark 1005 and current position of the mobile device 100. The list 1015 can include the title of the preferred media file 1017 and a user-selectable play button 1019 allowing the user to play the preferred media file 1017. One or ordinary skill in the art will appreciate that fewer or more user-selectable buttons and options, and more or less information associated with the landmark 1005 can be displayed in the pop-up window 1010 than is illustrated in FIG. 10.

In the particular implementation illustrated in FIG. 10, the list 1015 of preferred media files have been chosen based upon a portion of the title of the media file, the lyrics or dialogue of the media file, or correlations made by third parties between the media file and the landmark 1005 and current position of the mobile device 100. Additionally, the list 1015 illustrated in FIG. 10 ranks the preferred media files by the frequency the preferred media file has been played at the current position of the landmark 1005 and the mobile device 100. The list 1015 of preferred media files can indicate the popularity of the landmark 1005 and the social atmosphere associated with the landmark 1005 and current position of the mobile device 100, thereby providing the user of the mobile device 100 with information as to the culture of the current position of the mobile device 100.

Figure 11:
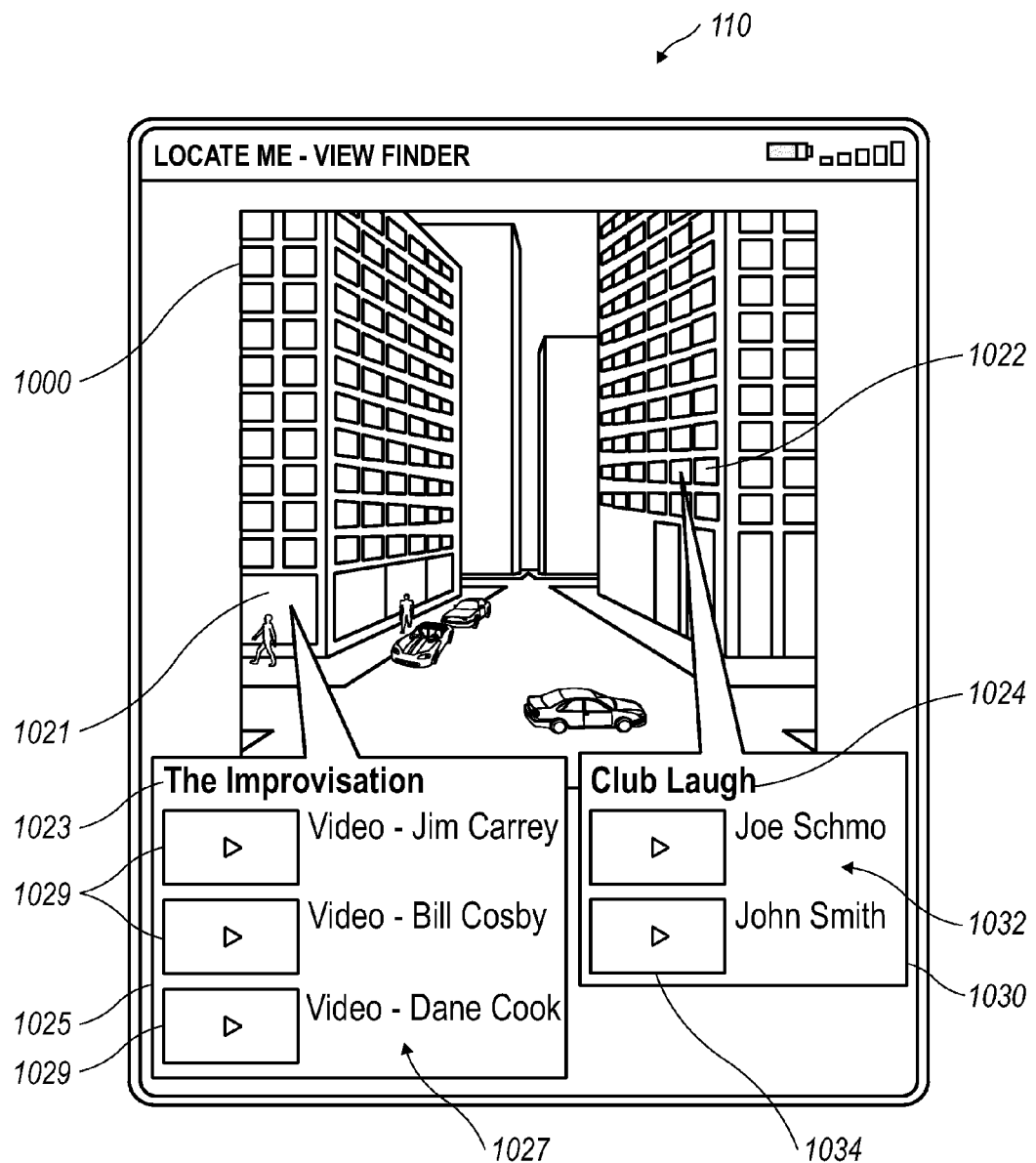
FIG. 11 is an exemplary screenshot of the system and method of determining a location-based preferred media file, in accordance with an alternative implementation that utilizes a camera viewfinder, illustrating a comparison of two lists of preferred media files.

FIG. 11 illustrates an alternative implementation of the system and method of determining a location-based preferred media file utilizing a mobile phone camera viewfinder, where the location-based preferred media file of more than one location can be displayed. In FIG. 11, the application configured to determine the preferred media file or files associated with the current position of the mobile device 100 has been executed, and the current position of the mobile device has been determined. The viewfinder window 1000 depicts a street view of a city associated with the current position of the mobile device 100. In particular, there are two particular venues 1021, 1022 shown in the viewfinder window 1000 that are associated with the current position of the mobile device 100. The application configured to retrieve the preferred media files associated with the particular venues, identifies the two particular venues, retrieves the associated preferred media files, and displays the results in pop-up windows 1025, 1030 displayed proximate to the venues 1021, 1022, shown in the viewfinder window 1000.

In the particular implementation in FIG. 11, the two venues 1021, 1022 are buildings housing comedy clubs. The first venue 1021 is has a pop-up window 1025 displayed proximate the building identifying the name 1023 of the venue 1021, the Improvisation. The first pop-up window 1025 also includes a list 1027 of preferred media files 1029 associated with the first venue 1021 associated with the current position of the mobile device 100. A second pop-up window 1030 is displayed proximate to the second venue 1022. The second pop-up window 1030 includes the name of the second venue 1022, Club Laugh, and a second list 1032 of preferred media files 1034 associated with the second venue 1022. The preferred media files 1029, 1034 of both the first and second pop-up window 1025, 1030 are shown as graphical items which can be selected by the user to play the preferred media file associated with the graphical item. In FIG. 11, the preferred media files are video files, such as video clips, of comedians who are associated with the venues 1021, 1022. The lists 1027, 1034 can be compiled and ranked by an external resource or a local resource that tracks and updates media files that have been marked as being associated with the venues 1021, 1022. For example, the lists 1027, 1032 can be retrieved from an external source, such as the websites of the venues 1021, 1022 which monitor and rank the popularity of comedians who have performed at the venues 1021, 1022. In the particular implementation illustrated in FIG. 11, the list 1027 associated with the first venue 1021 lists the videos 1029 of comedians who have performed at The Improvisation and ranks the videos by the top three comedians to sell out comedy shows. Similarly, the list 1032 associated with the second venue 1022, Club Laugh, lists the videos 1034 of the top comedians who have performed at the second venue 1022 and ranks the videos by the top comedians to sell out comedy shows. With the lists 1027, 1032 of preferred media files associated with the venues 1021, 1022 shown in the viewfinder window 1000, a user is provided with information relating to the popularity and the social atmosphere of the vicinity and venues 1021, 1022 associated with the current position of the mobile device 100. For example, in FIG. 11, a user can determine which comedy club best suits his or her humor, and thus, which comedy club to go to based on the preferred media files associated with the venues 1021, 1022. Providing a list of preferred media for each venue 1021, 1022 shown on the display screen 110 of a mobile device 100 configured to determine location-based preferred media files allows for a comparison of the preferred media files 1029, 1034 and a comparison of the venues 1021, 1022 associated with current location of the mobile device 100. One of ordinary skill in the art will appreciate that fewer or more preferred media files, options, and information can be included in the pop-up windows 1025, 1030 than are shown in FIG. 11.

In any implementation of the system and method for determining a location-based preferred media files described herein, the data representative of the preferred media file(s) associated with the current position of the mobile device 100 can be presented on the display screen as a list. The list of preferred media files can be a list of preferred media files such as news clips that have discussed or reported on the venue(s), video clips or audio clips of reviews of the venue(s), music files associated with artists who have played at the venue(s), music files associated with the type or genre of music played at the venue(s), video clips of celebrities who have visited the venue(s), or any other similar preferred media files that provide information relating to the current location of the mobile device 100. Additionally, the lists of preferred media files can be organized by: the frequency the preferred media file has been played within a predetermined distance from the current position of the mobile device 100; the frequency that the preferred media file has been requested within a predetermined distance from the current position of the mobile device 100; the frequency that preferred media file has been searched for on an internet search engine or a search database within a predetermined distance from the current position of the mobile device 100; or any other frequency.

In other implementations, the preferred media files can be ranked based on a frequency that is determined by the total number of plays of the preferred media files at the venue(s) or within a predetermined distance from the current position of the mobile device. For example, the number of plays can be the total number of times the preferred media file has been played, including multiple plays by a single playback device. Alternatively, the number of plays can be the total number of unique plays, where a unique play counts only playbacks by unique devices so that one device playing the file multiple times will only be counted once. In other words, the total number of unique plays is the total number of playback devices that have played the preferred media file at least one while positioned at the venue(s) associated with the current position of the mobile device 100 or positioned within a predetermined distance from the current position of the mobile device 100. One of ordinary skill in the art will appreciate that the features in each of the figures described herein can be combined with one another and arranged to achieve the described benefits of the presently disclosed system and method for determining a location-based preferred media file. Additionally, one of ordinary skill will appreciate that the elements and features from the illustrated implementations herein can be optionally included to achieve the described benefits of the presently disclosed system and method for determining a location-based preferred media file.

Figure 12:
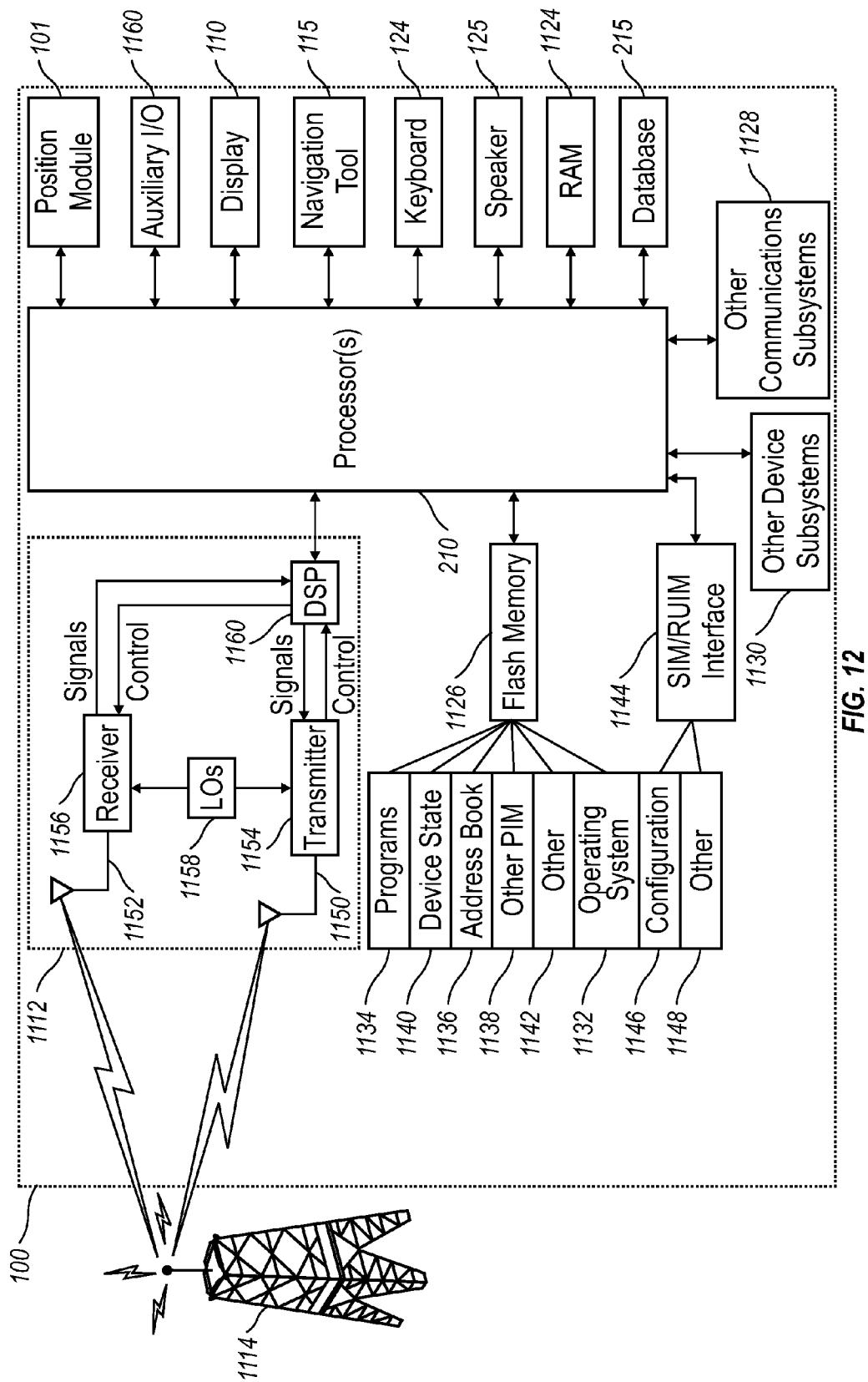
FIG. 12 is a block diagram representing a mobile device interacting in a communication network in accordance with an exemplary implementation of the present disclosure.

An exemplary implementation of a mobile device 100 configured to determine a location-based preferred media file using the system and method described herein, can include components as illustrated in FIG. 12. While the components of FIG. 12 are not all inclusive, FIG. 12 illustrates components that can be included on a mobile device 100 according to the present disclosure. Additional components are required to allow the mobile device 100 to function, but have been omitted for clarity.

As illustrated in FIG. 12, the mobile device 100 includes a communication subsystem 1112 to perform all communication transmission and reception with a wireless network 1114. A processor module 210 can be connected with an auxiliary input/output (I/O) subsystem 1130 which can be coupled to the mobile device 100. The processor module 210 can include one or more processors. Additionally, the processors can be micro-processors for example. In at least one implementation, the processor module 210 can be coupled to a serial port (for example, a Universal Serial Bus port) which can allow for communication with other devices or systems. The display 110 can be coupled to the processor module 210 to allow for displaying of information to a user of the mobile device 100. When the mobile device 100 is equipped with a keyboard 124, the keyboard 124 can also be connected with the processor module 210. The mobile device 100 can include a speaker 125, a microphone, random access memory (RAM) 1124, and flash memory 1126, all of which can be coupled to the processor module 210. Other similar components can be provided on the mobile device 100 as well and optionally coupled to the processor module 210. Other communication subsystems 1130 and other communication device subsystems 1128 are generally indicated as being functionally connected with the processor module 210 as well. An example of the communication subsystem 1112 is that of a short range communication system such as BLUETOOTH® communication module or a WI-FI® communication module (a communication module in compliance with IEEE 802.11 set of protocols) and associated circuits and components. The processor module 210 is able to perform operating system functions and enables execution of programs on the mobile device 100. In some implementations not all of the above components can be included in the mobile device 100.

The auxiliary I/O subsystem 1160 can take the form of a trackpad navigation tool, or a trackball, a thumbwheel, a navigation pad, a joystick, touch-sensitive interface, or other I/O interface. While the above examples have been provided in relation to the auxiliary I/O subsystem 1160, other subsystems capable of providing input or receiving output from the mobile device 100 are considered within the scope of this disclosure. Other keys can be placed along the side of the mobile device 100 to function as escape keys, volume control keys, scrolling keys, power switches, or user programmable keys, and can likewise be programmed accordingly.

Furthermore, the mobile device 100 is equipped with components to enable operation of various programs, as shown in FIG. 12. For example, such a program can be a computer application programmed to determine location-based preferred media files or to retrieve directions and maps associated with the current position of the mobile device 100. In an exemplary implementation, the flash memory 1126 is enabled to provide a storage location for the operating system 1132, device programs 1134, and data. The operating system 1132 is generally configured to manage other programs 1142 that are also stored in memory 1126 and executable on the processor 210. The operating system 1132 honors requests for services made by programs 1134 through predefined program 1134 interfaces. More specifically, the operating system 1126 typically determines the order in which multiple programs 1134 are executed on the processor 210 and the execution time allotted for each program 1134, manages the sharing of memory 1126 among multiple programs 1134, handles input and output to and from other device subsystems 1130, and so on. In addition, users can typically interact directly with the operating system 1132 through a user interface which can include the keyboard 124 and display screen 110. While in an exemplary implementation the operating system 1132 is stored in flash memory 1126, the operating system 1132 in other implementations is stored in read-only memory (ROM) or similar storage element (not shown). As those skilled in the art will appreciate, the operating system 1132, device program 1134 or parts thereof can be loaded in RAM 1124 or other volatile memory.

In one exemplary implementation, the flash memory 1126 contains programs 1134 for execution on the mobile device 100 including an address book 1136, a personal information manager (PIM) 1138, and the device state 1140. Furthermore, programs 658 and other information 1148 including data can be segregated upon storage in the flash memory 1126 of the mobile device 100.

When the mobile device 100 is enabled for two-way communication within the wireless communication network 1114, the mobile device 100 can send and receive messages from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 100 can require a unique identifier to enable the communication device 100 to transmit and receive messages from the communication network 1114. Other systems may not require such identifying information. GPRS, UMTS, and EDGE use a Subscriber Identity Module (SIM) in order to allow communication with the communication network 1114. Likewise, most CDMA systems use a Removable User Identity Module (RUIM) in order to communicate with the CDMA network. The RUIM and SIM card can be used in multiple different mobile devices 100. The mobile device 100 can be able to operate some features without a SIM/RUIM card, but the mobile device will not be able to communicate with the network 1114. A SIM/RUIM interface 1144 located within the mobile device 100 allows for removal or insertion of a SIM/RUIM card (not shown). The SIM/RUIM card features memory and holds key configurations 1146, and other information 1148 such as identification and subscriber related information. With a properly enabled mobile device 100, two-way communication between the mobile device 100 and communication network 1114 is possible.

If the mobile device 100 is enabled as described above or the communication network 1114 does not require such enablement, the two-way communication enabled mobile device 100 is able to both transmit and receive information from the communication network 1114. The transfer of communication can be from the mobile device 100 or to the mobile device 100. In order to communicate with the communication network 1114, the mobile device 100 in the presently described exemplary implementation is equipped with an integral or internal antenna 1150 for transmitting messages to the communication network 1114. Likewise the mobile device 100 in the presently described exemplary implementation is equipped with another antenna 1152 for receiving communication from the communication network 1114. These antennae (1152, 1150 in another exemplary implementation are combined into a single antenna (not shown). As one skilled in the art would appreciate, the antenna or antennae (1152, 1150) in another implementation are externally mounted on the mobile device 100.

When equipped for two-way communication, the mobile device 100 features the communication subsystem 1112. As is understood in the art, the communication subsystem 1112 is modified so that the subsystem 1112 can support the operational needs of the mobile device 100. The subsystem 1112 includes a transmitter 1154 and receiver 1156 including the associated antenna or antennae (152, 1150) as described above, local oscillators (LOs) 1158, and a processing module which in the presently described exemplary implementation is a digital signal processor (DSP) 1160.

The present disclosure contemplates that communication by the mobile device 100 with the wireless network 1114 can be any type of communication that both the wireless network 1114 and mobile device 100 are enabled to transmit, receive and process. In general, these can be classified as voice and data. Voice communication generally refers to communication in which messages for audible sounds are transmitted by the mobile device 100 through the communication network 1114. Data generally refers to all other types of communication that the mobile device 100 is capable of performing within the constraints of the wireless network 1114.

Example device programs that can depend on such data include email, contacts and calendars. For each such program, synchronization with home-based versions of the programs can be desirable for either or both of the program's long term and short term utility. As an example, emails are often time sensitive, so substantially real time synchronization can be desired. Contacts, on the other hand, can be usually updated less frequently without inconvenience. Therefore, the utility of the mobile device 100 is enhanced when connectable within a communication system, and when connectable on a wireless basis in the network 1114 in which voice, text messaging, and other data transfer are accommodated.

The technology described herein can take the forms of hardware, software or both hardware and software elements. In some implementations, the technology is implemented in software, which includes, but is not limited to, firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums as signal carriers per se are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art. Additionally, the memory can be a non-transitory computer readable medium and can include processor executable instructions and data structures that implement aspect of the subject innovation.

Even more, the present technology can take the form of hardware, or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums as signal carriers per se are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk, an optical disk, transitory memory, and non-transitory memory. Current examples of optical disks include compact disk-read only memory (CD-ROM), compact disk-read/write (CD-R/W), DVD, and Blu Ray™. Additionally, Non-transitory memory also can store programs, device state, various user information, one or more operating systems, device configuration data, and other data that may need to be accessed persistently. Both processors and program code for implementing each medium as an aspect of the technology can be centralized or distributed (or a combination thereof) as known to those skilled in the art.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem, Wi-Fi, and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

Exemplary implementations have been described hereinabove regarding a system and method for determining a location-based preferred media file. With the system and method for determining a location-based preferred media file, information relating to the popularity, reviews, rating, ambiance, atmosphere, and culture of the venues and vicinity surrounding or associated with the current position of mobile devices is readily available to the mobile device without having use an external device or a manual search engine, such as an internet search engine. Additionally, the present disclosure enables review of relevant media content in the form of preferred media. The presentation of the preferred media allows a user to receive limited relevant information. Furthermore, when enabled for future location review, the selection of a destination is enhanced. Also, when presented with multiple venues in proximity, the present discloser enables a more complete review of the surrounding vicinity. Various modifications to and departures from the disclosed implementations will occur to those having skill in the art. The subject matter that is intended to be within the spirit of this disclosure is set forth in the following claims.

We claim:

1. A mobile communications device that determines location-based preferred media files, the communications device comprising:
   a display having a display screen;
   a camera viewfinder;
   a position module; and
   a processor communicatively coupled to the display, camera viewfinder, and position module, the processor configured to execute instructions to:
   selectively determine a current position of the communications device based at least partially on position data obtained from the position module and on using a camera viewfinder of the communication device for automatically identifying a landmark within a vicinity of the communications device, wherein the landmark can be one of a monument, a building sign, a building exterior, a street sign, or other identifying landmark associated with a particular venue;
   establish data communication with two or more other communication devices located within a predetermined distance from the determined current position of the communications device;
   request playback data from each of the two or more other communications devices, the playback data identifying a number of times each of the two or more other communication devices played each of a collection of media files at the determined current position or within the predetermined distance from the determined current position;
   responsive to selectively determining the current position of the communication device, automatically determine a preferred media file based on a total number of times that is indicated by the playback data of unique play counts of the preferred media file representative of a total number of unique playback devices that have played the preferred media file obtained from the two or more other communication devices at the current position or within a predetermined distance from the current position of the communication device to provide a location-based preferred media file; and
   in response to the selectively determining the current position of the communication device and the determining the preferred media file, automatically display on the display screen data representative of the preferred media file for playback on the communications device.

2. The communications device as recited in claim 1, wherein the processor is configured to execute instructions to:

selectively determine the current position of the communications device in response to actuation of a user selectable option on a user interface of the communications device which launches an application for determining the location-based preferred media file and further associate the current position of the communications device with a particular venue.

3. The communications device as recited in claim 2, wherein the association of the current position of the communications device with the particular venue further comprises searching a remote server comprising a database of media files using coordinates of the determined current position.

4. The communications device as recited in claim 2, wherein the particular venue is one of a bar, club, park, scenic location, monument, or attraction.

5. The communications device as recited in claim 2, wherein the particular venue is one of a street, district, or neighborhood.

6. The communications device as recited in claim 1, wherein the preferred media file is at least one of an audio file or video file.

7. The communications device as recited in claim 1, wherein the processor is further configured to execute instructions to determine a frequency that a media file has been played on another communications device based on a total number of plays or unique plays on the other communications device.

8. The communications device as recited in claim 1, wherein the processor is further configured to execute instructions to determine a frequency that a media file has been played on another communications device based on data obtained from a resource external to the communications device.

9. The communications device as recited in claim 8, wherein the external resource is one of an internet site, blog, a remote server comprising a database of media files, text based posts, or trending data.

10. The communications device as recited in claim 1, wherein the processor is further configured to execute instructions to:
display a request dialog box on a display screen of the communications device, wherein the request dialog box includes graphical items to request the preferred media file according to genre, five top played files, ten top played files, or a top media file.

11. A method of determining location-based preferred media files using a mobile communications device that communicates with other communication devices, the method comprising:
selectively determining, via a processor communicatively coupled to a display having a display screen, a camera viewfinder, and a position module, of the communications device, a current position of the communications device based at least partially on position data obtained from the position module and on using the camera viewfinder of the communication device for automatically identifying a landmark within a vicinity of the communications device, wherein the landmark can be one of a monument, a building sign, a building exterior, a street sign, or other identifying landmark associated with a particular venue;
establishing data communication with two or more other communication devices located within a predetermined distance from the determined current position of the communications device;
requesting playback data from each of the two or more other communications devices, the playback data identifying a number of times each of the two or more other communication devices played each of a collection of media files at the determined current position or within the predetermined distance from the determined current position;
responsive to selectively determining the current position of the communication device, automatically determining a preferred media file based on a total number of times that is indicated by the playback data of unique play counts of the preferred media file representative of a total number of unique playback devices that have played the preferred media file obtained from the two or more other communication devices at the current position or within a predetermined distance from the current position of the communication device to provide a location-based preferred media file; and
responsive to the selectively determining the current position of the communication device and the determining the preferred media file, automatically displaying on the display screen data representative of the preferred media file at the communications device.

12. The method as recited in claim 11, wherein the preferred media file is at least one of an audio file and a video file.

13. The method as recited in claim 12, further comprising receiving a request for a particular genre of audio file and determining a most popular media file based on the genre and a total number of times an individual media file is played on another communications device within the predetermined distance from the current position of the communications device.

14. The method as recited in claim 11, further comprising determining a most popular media file based upon a total number of other devices which have played the most popular media file within the predetermined distance from the current position of the communications device.

15. The method as recited in claim 14, wherein the most popular media file is an audio file and the determination is based upon a portion of the title of the audio file.

16. The method as recited in claim 15, wherein the most popular audio file is available for download from a remote database of audio files.

17. The method as recited in claim 11, further comprising determining a most popular media file based upon a total number of times an individual media file is played by other communication devices within the predetermined distance from the current position of the communications device.

18. A non-transitory computer-readable medium having stored therein instructions which, when executed by a processing device, cause a mobile communications device to perform a method comprising:
selectively determining a current position of the communications device based at least partially on position data obtained from a position module of the communication device and on using a camera viewfinder of the communication device for automatically identifying a landmark within a vicinity of the communications device, wherein the landmark can be one of a monument, a building sign, a building exterior, a street sign, or other identifying landmark associated with a particular venue;
establishing data communication with two or more other communication devices located within a predetermined distance from the determined current position of the communications device;
requesting playback data from each of the two or more other communication devices, the playback data identifying a number of times each of the two or more other communication devices played each of a collection of media files at the determined current position or within the predetermined distance from the determined current position;

responsive to selectively determining the current position of the communication device, automatically determining a preferred media file based on a total number of times that is indicated by the playback data of unique play counts of the preferred media file representative of a total number of unique playback devices that have played the preferred media file obtained from the two or more other communication devices at the current position or within a predetermined distance from the current position of the communication device to provide a location-based preferred media file; and responsive to the selectively determining the current position of the communication device and the determining the preferred media file, automatically displaying on a display screen of a display of the communications device data representative of the preferred media file at the communications device.

19. The non-transitory computer-readable medium as recited in claim 18, wherein the instructions stored therein which cause the processor to obtain data representative of at least one of an audio file and a video file.

* * * * *